United States Patent
Barreau et al.

(10) Patent No.: US 11,082,227 B2
(45) Date of Patent: Aug. 3, 2021

(54) METHOD FOR CUSTOMISING A SECURE DOCUMENT

(71) Applicant: IDEMIA FRANCE, Colombes (FR)

(72) Inventors: Cédric Barreau, Colombes (FR); Alban Feraud, Colombes (FR)

(73) Assignee: IDEMIA FRANCE, Colombes (FR)

(*) Notice: Subject to any disclaimer, the term of this patent is extended or adjusted under 35 U.S.C. 154(b) by 172 days.

(21) Appl. No.: 16/060,708

(22) PCT Filed: Dec. 9, 2016

(86) PCT No.: PCT/FR2016/053318
§ 371 (c)(1),
(2) Date: Jun. 8, 2018

(87) PCT Pub. No.: WO2017/098189
PCT Pub. Date: Jun. 15, 2017

(65) Prior Publication Data
US 2018/0367312 A1 Dec. 20, 2018

(30) Foreign Application Priority Data
Dec. 10, 2015 (FR) ........................................ 1562108

(51) Int. Cl.
*H04L 9/32* (2006.01)
*H04L 29/06* (2006.01)

(52) U.S. Cl.
CPC ........ *H04L 9/3234* (2013.01); *H04L 63/0428* (2013.01); *H04L 63/0853* (2013.01)

(58) Field of Classification Search
CPC ............... H04L 9/3234; H04L 63/0428; H04L 63/0853
See application file for complete search history.

(56) References Cited

U.S. PATENT DOCUMENTS 5,557,679 A * 9/1996 Julin ..................... G06Q 20/341
380/249
6,367,011 B1 * 4/2002 Lee ......................... G06F 21/77
380/255

(Continued)

FOREIGN PATENT DOCUMENTS

EP          1 544 706 A1     6/2005

OTHER PUBLICATIONS

International Search Report and Written Opinion dated Mar. 30, 2017, International Application No. PCT/FR2016/053318, 8 pages, (English translation of ISR only).

*Primary Examiner* — Hee K Song
(74) *Attorney, Agent, or Firm* — MH2 Technology Law Group LLP

(57) ABSTRACT

A method of personalizing a security document, which includes a processing method performed by a processing device in order to prepare personalization of a security document. The method includes obtaining personalization data, encrypting the personalization data by using diversification data associated with the security document so as to produce encrypted data, and transmitting the encrypted data to a personalization device. The encrypted data enables the device to personalize the security document by using the encrypted data and the diversification data. Also described is a method of personalizing a security document by means of such a personalization device, as well as devices that employ the methods.

16 Claims, 3 Drawing Sheets

(56) References Cited

U.S. PATENT DOCUMENTS

| | | | | |
|---|---|---|---|---|
| 6,729,549 B2* | 5/2004 | Hamann | ............... | G06K 17/00 |
| | | | | 235/492 |
| 7,762,457 B2* | 7/2010 | Bonalle | ............... | G06Q 20/14 |
| | | | | 235/383 |
| 2007/0228158 A1* | 10/2007 | Brown | ............... | G06Q 20/355 |
| | | | | 235/380 |
| 2008/0005567 A1* | 1/2008 | Johnson | ............ | G06Q 20/3552 |
| | | | | 713/172 |
| 2013/0067216 A1* | 3/2013 | Tanner | ............... | G06Q 20/354 |
| | | | | 713/155 |
| 2014/0291395 A1* | 10/2014 | Wankmueller | ..... | G06Q 20/3278 |
| | | | | 235/381 |
| 2015/0302409 A1* | 10/2015 | Malek | ............... | G06Q 20/3224 |
| | | | | 705/44 |

* cited by examiner

METHOD FOR CUSTOMISING A SECURE DOCUMENT

CROSS-REFERENCE TO RELATED APPLICATIONS

This application is a U.S. National Stage application of International Application No. PCT/FR2016/053318 filed 9 Dec. 2016, which claims priority to French Application No. 1562108 filed 10 Dec. 2015, the entire disclosures of which are hereby incorporated by reference in their entireties.

TECHNOLOGICAL BACKGROUND

The invention relates to the field of security documents, such as bank cards or identity cards, and electronic passports, and it relates more particularly to personalizing such documents.

Security documents are documents that include physical characteristics that enable the bearer of the document and the document itself to be authenticated reliably. In other words, these physical characteristics make it possible, by using a predetermined authentication protocol, to be sure that a person is indeed the legitimate proprietor of the security document in question, and that the document itself is an authentic document. These physical characteristics (printing, special materials, stored digital data, . . . ) are generally difficult to counterfeit so as to protect the electronic document against any malicious act.

Security documents come in various forms that are more or less complex. These include in particular security documents that are said to be "electronic" in the sense that they include an electronic module having at least one memory, as contrasted to conventional security documents that do not include such a memory. Identity cards, bank cards (generally so-called "smart" cards including an integrated circuit or "chip"), or indeed electronic passports, constitute common examples of security documents.

During fabrication, such security documents are generally personalized. This personalization step consists in applying on and/or in the security document personal data that is specific to the future proprietor of the document. By way of example, the personal data may be printed or embossed on the surface of the document. For electronic security documents, such personal data may also be stored in the memory of the electronic module. Typically, during personalization of a bank card, the manufacturer applies personal data of the bearer on the faces of the card (surname, given name, card number, etc.) and stores personal data in the chip of the card.

FIG. 1 is a diagram showing a personalization method as used conventionally for personalizing a security document. In this example, a first entity 2 (present at a first site ST2) and a second entity 4 (present at a second site ST4) cooperate with each other in order to personalize a security document 6.

To do this, the entity 2 collects personal data specific to the bearer of a security document 6 for personalizing and then converts (E2) this personal data into personalization data PR defining physical personalizations (printing, embossing, data storage, . . . ) to be applied to the security document 6. Subsequently, the entity 2 sends (E4) this personalization data PR to the entity 4, which then continues the process on the site ST4. For this purpose, the entity 4 receives (E6) the personalization data PR, and then personalizes (E8) the security document 6 on the basis of the personalization data PR.

Nevertheless, that known method presents a risk in that a security document might potentially be personalized with personal data that were not intended for that document. Specifically, an entity 4 might personalize the security document 6 erroneously (or deliberately) with personalization data associated with a person other than the legitimate proprietor of the security document. At present, the personalization process is thus the subject of significant risks concerning reliability and security.

Security problems also exist when a plurality of different entities 4 share the task of personalizing a set of security documents. A risk exists insofar as a plurality of entities 4 (present at different sites) have access to the personalization data PR sent by the entity 2. When the personalization data PR presents a confidential nature, dispersing such data among various actors capable of processing and using the data is itself problematic.

Furthermore, the entity 4 in charge of personalization generally benefits from a certain amount of flexibility concerning the choice of blank security documents to be used when performing the personalization E8. In certain circumstances, the entity 4 can select from among a plurality of sources for provisioning security documents 6. At present, the entity 2 or a third party do not have means for ensuring that the entity 4 does indeed perform the personalization E8 on a security document 6 having a specific origin. This leads to economic uncertainty, in particular for certain manufacturers seeking to make secure their activity of fabricating security documents.

At present, there thus exists a need for more security and reliability in the process of personalizing a security document.

OBJECT AND SUMMARY

One of the objects of the invention is to remedy the shortcomings of the above-described state of the art.

To this end, the present invention provides a processing method, performed by a processing device, for preparing personalization of a security document, the method comprising:

obtaining personalization data for personalizing the security document;

encrypting the personalization data using diversification data associated with the security document and/or with a person, so as to produce encrypted data; and transmitting the encrypted data to a personalization device in order to enable it to personalize the security document from the encrypted data and the diversification data.

In a particular implementation, the diversification data is associated with (or linked to) the security document, but not a person.

In a particular embodiment, the diversification data is present in or on the security document.

The invention serves advantageously to make secure the process of personalizing a security document. For this purpose, an intrinsic link is created between the personalization data and the security document. This is possible since the diversification data (used for encrypting and decrypting the personalization data) is present on or in the security document, in any suitable form (digital data stored in a memory, physical pattern present on the document, etc.). Thus, it is only by analyzing the security document that it is possible to recover the diversification data during personalization. In other words, the manufacturer supervising personalization can obtain the diversification data DV only from the security document itself. Typically, the diversification data (and thus the corresponding personalization data) can be recovered only when personalization of the security document begins, thereby greatly reducing the above-mentioned security risks.

Furthermore, even when the entity in charge of personalization is in possession of the diversification data, that entity is limited in the use it can make of that data for recovering personalization data. Thus, by means of the invention, an entity in charge of personalizing a first security document can use the diversification data present on said first document for personalizing that document only, or possibly other security documents belonging to the same batch as said first security document (depending on whether the diversification data is allocated in unique manner or in collective manner to one or more security documents).

In a particular implementation, during encryption, the personalization data is encrypted using an encryption master key in combination with the diversification data.

In a particular implementation, the encryption master key is paired with a decryption master key that is distinct from the encryption master key.

In a particular implementation, the processing device uses a secure container for performing said encryption, the encryption master key being stored in the secure container, and wherein said secure container:

determines a derived key from the diversification data and the encryption master key; and uses the derived key to encrypt the personalization data in order to produce the encrypted data.

The present invention also provides a method of personalizing a security document, which method is performed by a personalization device and comprises:

receiving encrypted data;

analyzing the security document so as to recover diversification data associated with said security document, or obtaining diversification data associated with an individual;

decrypting data encrypted using the diversification data in order to obtain personalization data; and personalizing the security document from the personalization data.

In a particular implementation, at least a portion (or all) of the diversification data recovered during said analysis is present on or in the security document.

In a particular implementation, at least a portion of the diversification data comprises a pattern formed at the surface of the security document.

In a particular implementation, the security document comprises a memory storing at least a portion of the diversification data, the analysis comprising reading the memory in order to recover said at least a portion of the diversification data.

In a particular implementation, during decryption, the encrypted data is decrypted using the diversification data in combination with a decryption master key.

In a particular implementation, the decryption master key is paired with an encryption master key distinct from the decryption master key. The encryption master key may for example be the key that was used for obtaining the encrypted data by encryption.

In a particular implementation, the personalization device co-operates with a secure container to perform said decryption, wherein said secure container decrypts the encrypted data received by the personalization device so as to obtain said personalization data.

In a particular implementation, the secure container:

determines a derived key from the decryption master key and from the diversification data recovered by the personalization device during said analysis; and uses the derived key to decrypt the encrypted data received by the personalization device so as to obtain said personalization data.

In a particular implementation, said secure container:

determines a derived key from the decryption master key and from the diversification data recovered by the personalization device during said analysis; and transmits the derived key to an external terminal so that the external terminal decrypts the encrypted data so as to obtain said personalization data.

In a particular implementation, the security document includes an electronic module suitable for implementing the secure container. By way of example, the electronic module may be a subscriber identity module (also referred to as an eUICC module).

In a particular implementation, the decryption master key is stored in said secure container.

The present invention also provides a method of personalizing a security document, the method comprising:

a processing method performed by a processing device as defined above; and a personalization method performed by a personalization device as defined above;

the processing device transmitting the encrypted data to the personalization device so that it personalizes the security document from the encrypted data.

In a particular embodiment, the various steps of the control method and of the personalization method are determined by computer program instructions.

Consequently, the invention also provides a computer program on a data medium (or recording medium), the program being suitable for being performed in an electronic device, in a reader terminal, or more generally in a computer, the program including instructions adapted to performing steps of at least one of the methods as defined above.

The program can use any programming language and be in the form of source code, object code, or code intermediate between source code and object code, such as in a partially compiled form, or in any other desirable form.

The invention also provides a data medium (or recording medium) that is readable by a computer, and that includes instructions of a computer program as mentioned above.

The data medium may be any entity or device capable of storing the program. For example, the medium may comprise storage means, such as a ROM, e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The present invention also provides a processing device for preparing personalization of a security document, the device comprising:

an obtaining module suitable for obtaining personalization data for personalizing the security document;

an encryption module suitable for encrypting the personalization data using diversification data associated with the security document or with an individual, so as to produce encrypted data; and a transmission module suitable for transmitting the encrypted data to a personalization device in order to enable it to personalize the security document from the encrypted data and the diversification data.

The invention also provides a personalization device for personalizing a security document, the device comprising:

a receive module suitable for receiving encrypted data;

an analysis module suitable for analyzing the security document so as to recover diversification data associated with said security document or suitable for obtaining diversification data associated with an individual;

a decryption module suitable for decrypting the encrypted data using the diversification data in order to obtain personalization data; and a personalization module suitable for personalizing the security document from the personalization data.

It should be observed that the various implementations defined above concerning the processing method and also the personalization method, and also the advantages associated with those methods apply in analogous manner to the respective devices defined above. In particular, the diversification data may be present in or on the security document.

The invention also provides a system for personalizing a security document, said system comprising:

a processing device as defined above; and a personalization device as defined above;

the processing device being configured to transmit the encrypted data to the personalization device in order to enable it to personalize the security document from the encrypted data.

The security document defined in the above implementations of methods and embodiments of devices may be a smart card, e.g. in compliance with the standard ISO/IEC 7816.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF IMPLEMENTATIONS

As mentioned above, the invention relates to personalizing security documents, such as bank cards or identity cards, and electronic passports, for example.

In the embodiments described below, the security document is a smart card (e.g. in compliance with the standard ISO/IEC 7816) and suitable by way of example for being used as a bank card in order to perform banking operations. Nevertheless, it should be understood that smart cards other than bank cards and security documents other than smart cards may be envisaged in the ambit of the invention.

The invention sets out to make secure the personalizing of a security document. To do this, the invention, in various implementations, requires personalization data to be transmitted in encrypted form to the entity in charge of personalization, the encryption of the personalization data being performed on the basis of so-called "diversification" data associated with the security document. By way of example, this personalization data is present in and/or on the security document that is to be personalized. The diversification data may be a constituent part of the security document itself. The entity in charge of personalization can then decrypt the personalization data only if it has access to the security document itself, in or on which the diversification data is to be found. Recovering the diversification data from the security document makes it possible to decrypt the personalization data and thus to personalize the security document in question.

Unless specified to the contrary, elements that are common (or analogous) in more than one of the figures are given the same reference signs and they present characteristics that are identical (or analogous), such that these common elements are generally not described again for reasons of simplicity.

Figure 1:
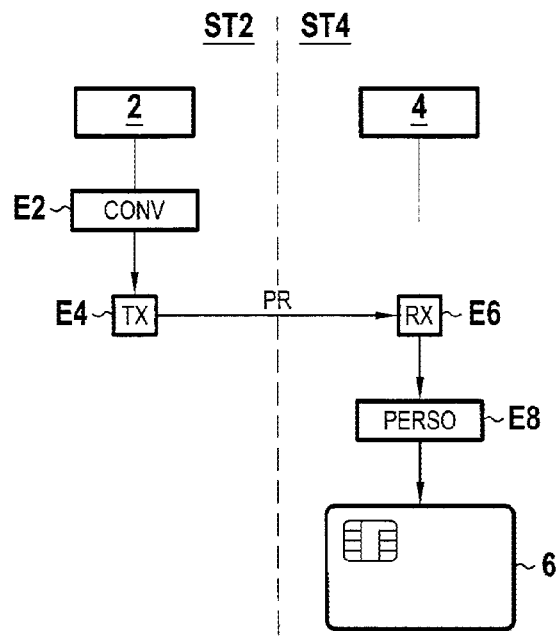
FIG. 1, described above, is a diagram showing a conventional method of personalizing a security document.
Figure 2:
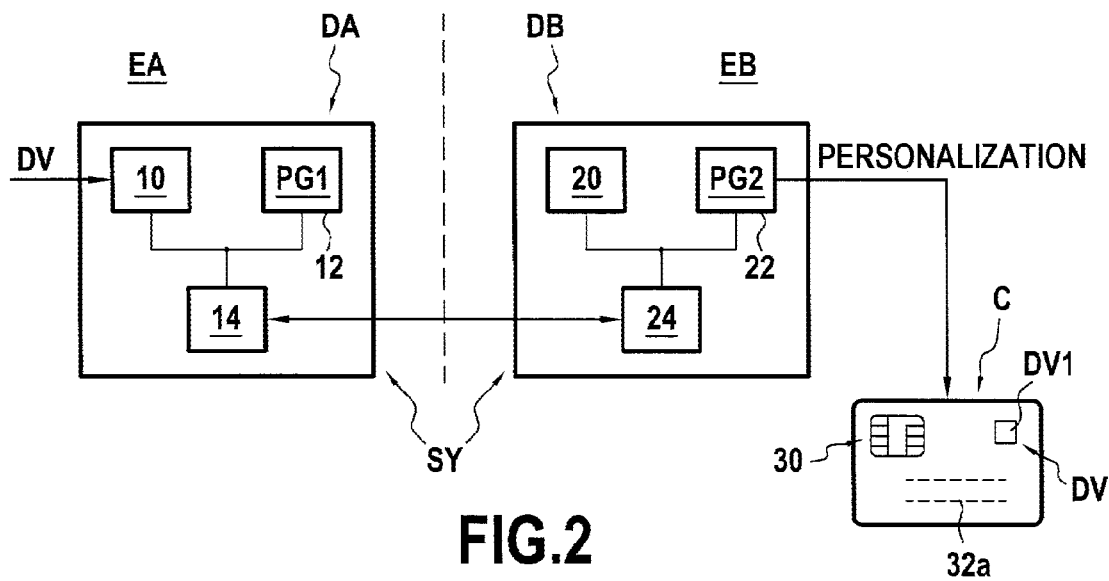
FIG. 2 is a diagram showing the structure of a system having a processing device and a personalization device, in a particular embodiment of the invention.

FIG. 2 is a diagram showing the structure of a processing device DA deployed under the supervision of an entity EA, and also the structure of a personalization device DB deployed under the supervision of an entity EB, in accordance with a particular implementation. In this example, the devices EA and EB are suitable for co-operating with each other so as to form a system SY.

In the presently-envisaged example, the processing device DA is suitable for preparing the personalization of a security document C, i.e. a smart card in this example. The personalization device DB (which is distinct from the security document C) is suitable for personalizing the smart card C on the basis of personalization data transmitted by the processing device DA.

More specifically, the processing device DA in this example comprises a processor 10, a non-volatile memory 12, and a communication interface 14. By way of example, the device DA presents the architecture of a computer.

The memory 12 is a rewritable non-volatile memory or a read only memory (ROM), this memory constituting a data medium (or recording medium) in accordance with a particular embodiment that is readable by the processing device DA and that stores a computer program PG1 in accordance with a particular embodiment. The computer program PG1 includes instructions for executing steps of a processing method in a particular implementation.

The communication interface 14 is suitable for communicating with a communication interface 24 of the personalization device DB, as explained below.

Figure 3:
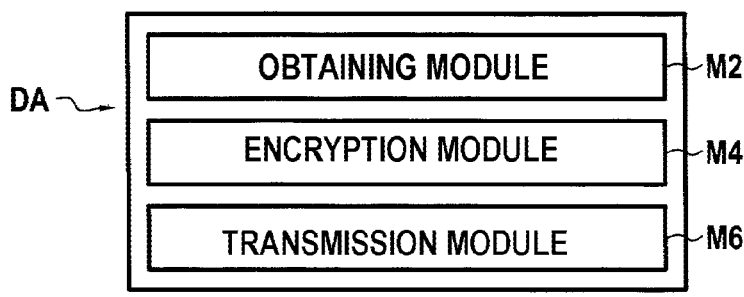
FIG. 3 is a diagram showing modules deployed in the FIG. 2 processing device, in accordance with a particular embodiment of the invention.

As shown in FIG. 3, the processor 10, under the control of the computer program PG1, and where appropriate co-operating with various hardware elements of the processing device DA (memories, etc.), deploys various modules in this example, namely: an obtaining module M2; an encryption module M4; and a transmission module M6.

The obtaining module M2 is suitable for obtaining personalization data DP for personalizing the security document C. In the presently-envisaged example, the obtaining module M2 is configured to obtain personal data specific to the future proprietor of the security document C, and to convert that personal data into personalization data DP.

The encryption module M4 is suitable for encrypting the personalization data DP so as to produce encrypted data DC, the encryption being performed using said diversification data DV associated with the security document C that is to be personalized. It is assumed in this example that the encryption module M4 is suitable for recovering the diversification data DV in appropriate manner. In a particular example, it should be observed that the diversification data DV is present in and/or on the security document C. In a particular example, the diversification data may be a constituent part of the security document C itself (as explained below). Nevertheless, it is not necessary for the encryption module M4 (and more generally the device DA) to have access to the security document C itself in order to obtain the diversification data DV, which diversification data may be transmitted by a third party or accessible from a database, for example.

As mentioned below, in a particular example, the encryption module M4 is configured to perform encryption in a secure container such as a hardware security module (HSM).

The transmission module M6 is suitable for transmitting the encrypted data DC to the personalization device DB in order to enable it to personalize the security document C on the basis of the encrypted data DC and of the diversification data DV associated with the security document C.

As shown in FIG. 2, the personalization device DB comprises a processor 20, a non-volatile memory 22, and the above-mentioned communication interface 24. The device DB is suitable for causing the security document C to be personalized on the basis of the encrypted data DC transmitted by the processing device DA.

The memory 22 is a rewritable non-volatile memory or a read only memory (ROM), this memory constituting a data medium (or storage medium) in accordance with a particular embodiment that is readable by the personalization device DB, and that stores a computer program PG2 in accordance with a particular embodiment. The computer program PG2 includes instructions for executing steps of a personalization method in accordance with a particular implementation.

The communication interface 24 is suitable for communicating with the communication interface 14 of the personalization device DA, as mentioned above.

Figure 4:
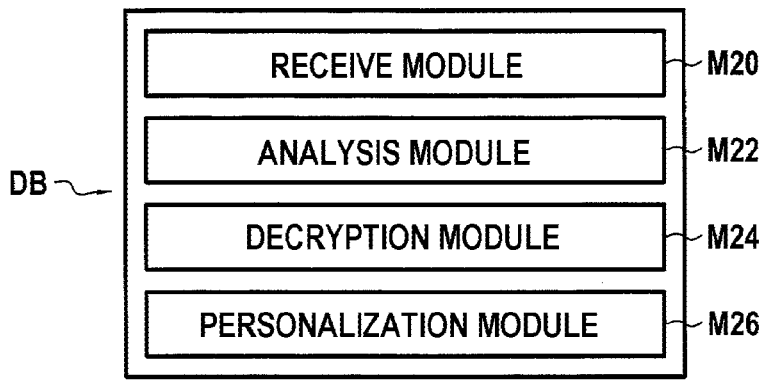
FIG. 4 is a diagram showing modules deployed in the FIG. 2 personalization device in accordance with a particular embodiment of the invention.

As shown in FIG. 4, in this example, the processor 20, under the control of the computer program PG2, and where appropriate co-operating with various hardware elements of the personalization device DB (memories, etc.), deploys various modules, namely: a receive module M20, an analysis module M22, a decryption module M24, and a personalization module M26.

The receive module M20 is suitable for receiving the encrypted data DC sent by the processing device DA. The encrypted data DC may be transmitted from the device DA to the device DB via an appropriate communications link, e.g. via a communications network (Internet, etc.) or using a suitable medium (memory stick, etc.).

The analysis module M22 is suitable for analyzing the security document C so as to recover the diversification data DV associated with the security document C. The diversification data DV may take on various forms depending on circumstances.

In a particular example, the diversification data DV is present in and/or on said document C. By way of example, the diversification data DV may comprise at least one pattern DV1 formed on the surface of the security document C. By way of example, the pattern may comprise at least one character, symbol, and/or graphics code (bar code, 2D code, etc.). The diversification data DV may also comprise data DV2 stored in a memory that is included, where applicable, in the security document C, as explained in greater detail below with reference to FIG. 6.

In a particular example, the diversification data DV is a constituent part of the security document C itself. In other words, the diversification data DV may comprise at least one constituent physical characteristic of the security document C. By way of example, the diversification data DV may be formed by at least one unclonable physical characteristic of the physical unclonable function (PUF) type of the security document C. By way of example, the diversification data DV may comprise at least one pattern formed by the structure of all or a portion of the security document C. By way of example, the diversification data DV may be formed in full or in part by a set of fibers constituting the security document C, the fibers presenting an arrangement or any other characteristic that characterizes the security document C.

Thus, the nature and the performance of the analysis of the document C by the analysis module M22 may vary depending on circumstances. By way of example, the analysis module M22 may use an optical reader unit (not shown) suitable for optically detecting the diversification data DV1 appearing at the surface of the security document C. The analysis module M22 may also comprise a reader unit for reading a memory that is included, where appropriate, in the security document C, as mentioned above.

In a particular example, the diversification data DV is not associated with the security document C, but with a person, e.g. the legitimate bearer (the proprietor) of the security document C. In a particular example, the diversification data DV comprises at least one physical characteristic of the bearer of the security document C, such as for example a fingerprint of the bearer, and an iris print of the bearer, . . . .

The decryption module M24 is suitable for decrypting the encrypted data DC received by the processing device DA so as to obtain the personalization data DP. This decryption is performed using the diversification data DV recovered by the analysis module M22. As explained in detail below, in certain implementations, the decryption module M24 does not itself decrypt the encrypted data, but rather co-operates with an entity that is external to the personalization device DB (e.g. a secure container) in order to decrypt the encrypted data.

The personalization module M26 is suitable for personalizing the security document C on the basis of the personalization data DP recovered by the decryption module M24. For this purpose, the personalization module M26 interacts with all of the personalization units that are needed for performing the desired personalization (printer, etching, laser carbonizing, or embossing system, system for writing to a memory, etc.), which personalization units (not shown) may optionally be included in full or in part in the personalization device DB. By way of example, the personalization module M26 may be configured to send a print command to an external printer system in order to personalize the security document C by printing.

As mentioned above, the security document C may be in various forms. It may be an optionally electronic security document, e.g. in the form of a booklet or of a card.

Figure 6:
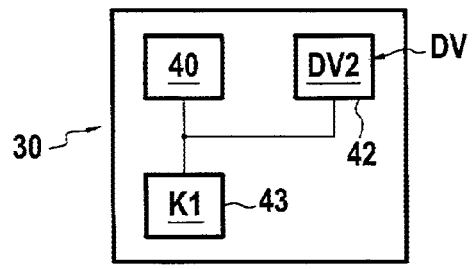
FIG. 6 is a diagram showing the structure of an electronic module of a security document in accordance with a particular embodiment of the invention.

As shown in FIG. 2, it is assumed in this example that the document C is a smart card, e.g. of the bank card type, including an electronic module 30 that is shown in greater detail in FIG. 6. By way of example, the smart card C may comply with the standard ISO/IEC 7816.

More specifically, in this example, the electronic module 30 comprises a processor 40, a non-volatile memory 42 storing diversification data DV2, and a non-volatile memory 43 that may store a master key K1 of nature and use that are explained below.

By way of example, the electronic module 30 may be an embedded subscriber identity module also known as an embedded universal integrated circuit chip (eUICC).

In an embodiment, the electronic module 30 may contain in the non-volatile memory 42 and/or 43, the result of diversifying the master key K1 by means of the diversification data DV1 and/or DV2.

The non-volatile memories 40 and 42 may constitute a single physical memory.

As mentioned above, the pattern DV1 formed at the surface of the card C constitutes a first example of diversification data DV. The data DV2 stored in the memory 42 constitutes a second example of diversification data DV. In a particular embodiment, the diversification data DV comprises both DV1 and DV2.

Furthermore, in this example, FIG. 2 shows the personalization 32a of the smart card C as performed by printing or embossing, for example. Other types of personalization of the smart card C can be envisaged, such as electrically personalizing the electronic module 30 in this example. The personalization performed by the entity DB may also comprise a particular configuration of the electronic module 30 or storing personalization data in the electronic module 30.

Figure 5:
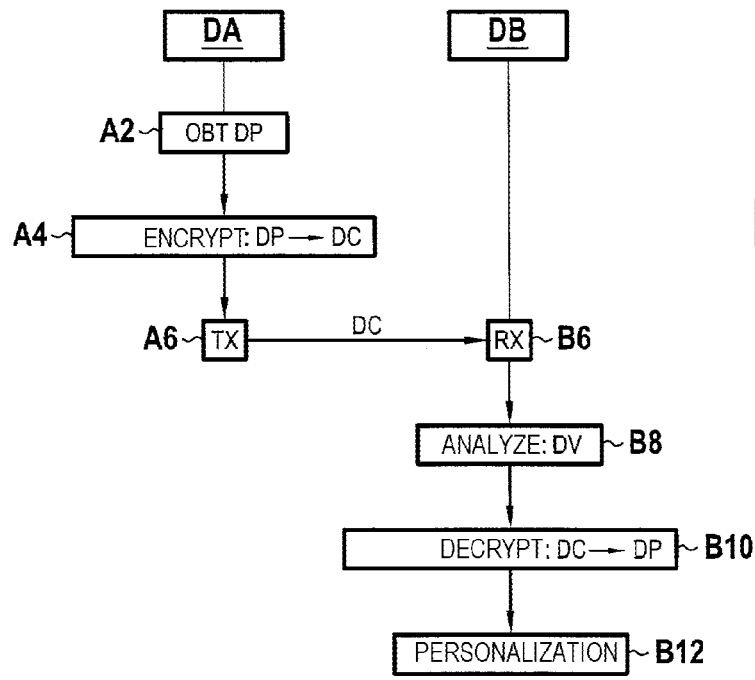
FIG. 5 is a flow chart showing the main steps of a processing method and a personalization method performed respectively by a processing device and by a personalization device, in accordance with a particular implementation of the invention.

A particular implementation is described below with reference to FIG. 5. More precisely, the processing device DA performs a processing method for preparing personalization of the security document C by executing the computer program PG1. Likewise, the personalization device DB performs a personalization method by executing the computer program PG2.

During step A2, the obtaining module M2 of the processing device DA obtains the above-mentioned personalization data DP, which data defines the personalization to be performed of the security document C. For this purpose, and by way of example, the obtaining module M2 obtains personal data associated with the future bearer of the security document C, and then converts that personal data into personalization data DP suitable for use by the personalization device DB.

During a step A4, the encryption module M4 encrypts the personalization data DP using the diversification data DV so as to produce encrypted data DC. The personalization data DP is thus associated (or linked) with the security document C that is to be personalized.

In order to recover the diversification data DV, the processing device DA need not necessarily have access to the security document C itself. Typically, the entity EA supervising the execution of the processing device DA does not actually possess the security document C while performing the processing method in order to prepare personalization of the security document C.

By way of example, the diversification data DV may be transmitted by a third party to the processing device DA, or it may be available for example in a database that is external to the processing device DA, the medium used possibly being a secure container such as a hardware security module (HSM).

In this example, it is assumed that the data DV2 stored in the electronic module 30 of the card C constitutes the diversification data DV. Alternatively, the pattern DV1 may be used as diversification data DV (or DV1 and DV2 may be used in combination).

In a particular implementation, during encryption A4, the personalization data DP is encrypted using an encryption master key K1 in combination with the diversification data DV. The master key K1 may for example be stored in a non-volatile memory of the processing device DA.

The transmission module M6 then sends (A6) the encrypted data DC to the personalization device DB so as to enable it to personalize the security document C from the encrypted data DC and the diversification data DV associated with the security document.

The receive module M20 of the personalization device DP receives the encrypted data DC during a step B6.

The analysis module M22 also analyzes (B8) the security document C so as to recover the diversification data DV present in or on the security document C, namely: the data DV2 stored in the memory 42, in this example. For this purpose, the analysis module M22 reads the memory 42 of the module 30 in order to recover the data DV2. It should be observed that the personalization device DB recovering the diversification data DV is possible in this example only insofar as the electronic module 30 is accessible for reading by the analysis module M22.

More generally, it is generally necessary for the entity EB to possess the security document C itself in order to enable the analysis B8 to be performed.

Where appropriate, the analysis step B8 may be performed prior to the receive step B6.

During a step B10, the decryption module M24 decrypts the encrypted data DC in order to obtain the personalization data DP. This decryption B10 is performed from the diversification data DV (i.e. the data DV2) as recovered in step B8.

As described above, in this particular implementation, the personalization data DP is encrypted during the encryption A4 using an encryption master key K1 in combination with the diversification data DV. Still in this implementation, during decryption B10, the encrypted data DC may be decrypted from a decryption master key K1a in combination with the diversification data DV. By way of example, this decryption master key K1a is stored in the non-volatile memory 43 of the electronic module 30.

In a first implementation, the master keys K1 and K1a used respectively for encryption A4 and decryption B10 are identical (when using symmetric encryption). In a second implementation, the master keys K1 and K1a are paired master keys that are different from each other (when using asymmetric encryption). Under such circumstances, the encryption master key K1 is suitable only for encryption, while the decryption master key K1a is suitable only for decryption.

During a step B12, the personalization module M26 then causes the security document C to be personalized on the basis of the personalization data DP recovered in the decryption step B10. By way of example, personalization may comprise physical modifications of the surface of the security document C, or indeed electrically configuring the electronic module 30. By way of example, personalization B12 may comprise forming patterns 32a (characters, symbols, serial number, photos, etc.) on the surface of the security document (by printing, embossing, laser carbonization, etc.). Personalization B12 may also comprise storing personalization data DP in a memory of the electronic module 30 (or performing any other suitable electrical configuration).

It should be observed that the personalization module M26 may include the printing, embossing, memory reading, etc. systems necessary for performing the desired personalization. Alternatively, the personalization module M26 may be configured to send at least one necessary command for triggering the appropriate personalization operation.

The invention serves advantageously to make secure the process of personalizing a security document. For this purpose, an intrinsic link is created between the personalization data and the security document. This is possible since the diversification data (used in encrypting and decrypting the personalization data) is associated with the security document. Such a link is made possible in particular when the diversification data is present in or on the security document, in any appropriate form (digital data stored in a memory, physical pattern present on the document, PUF, etc.). Thus, it is only by analyzing the security document that it is possible to recover the diversification data during personalization. In other words, the manufacturer EB supervising personalization can obtain the diversification data DV only from the security document itself. Typically, the entity EB will be in a position to recover the diversification data DV (and thus the corresponding personalization data) only when proceeding with the personalization of the security document in question.

Furthermore, even when the entity EB is in possession of the diversification data DV, the use to which that data can be put is limited to recovering personalization data. Thus, by means of the invention, the entity EB in charge of personalizing a first security document can use the diversification data DV present on said first document for personalizing that document, and possibly also on security documents forming part of the same batch as said first security document.

In a particular example, diversification data DV is allocated in unique manner to each given security document C so that obtaining the diversification data DV from a security document does not make it possible to obtain personalization data that is for other security documents. Alternatively, the same diversification data may be given collectively to a plurality (e.g. at least one batch) of security documents. Analysis of one security document then makes it possible to recover the diversification data that is valid for personalizing a set of security documents.

Furthermore, a consequence of the invention is that the entity EB in charge of personalization no longer has the possibility of selecting from a plurality of sources of supply in order to obtain the security document. Only the security document known to the entity EA (and the diversification data known thereto) enables the entity EB to decrypt the encrypted data needed for personalizing the security document in question.

In an embodiment described with reference to FIGS. 7 and 8, the processing device DA may use a secure container H1 for performing the encryption A4. Likewise, the personalization device DB may use a secure container H2 for performing the decryption B10.

A secure container (or digital safe) is suitable for storing cryptographic keys, and where appropriate, for performing encryption or decryption operations using such keys. A secure container may be of the hardware security module (HSM) type or it may be in the form of an IC card known as a "batchcard".

In a particular example, the secure container H1 is contained in memory in the processing device DA. In another embodiment, the processing device DA is suitable for co-operating with the secure container H1 situated outside the processing device DA in order to perform the encryption A4.

Likewise, in a particular embodiment, the secure container H2 is contained in memory in the personalization device DB. In another embodiment, the personalization device DB is suitable for co-operating with a secure container H2 situated outside the personalization device DB in order to perform the decryption B10.

Figure 7:
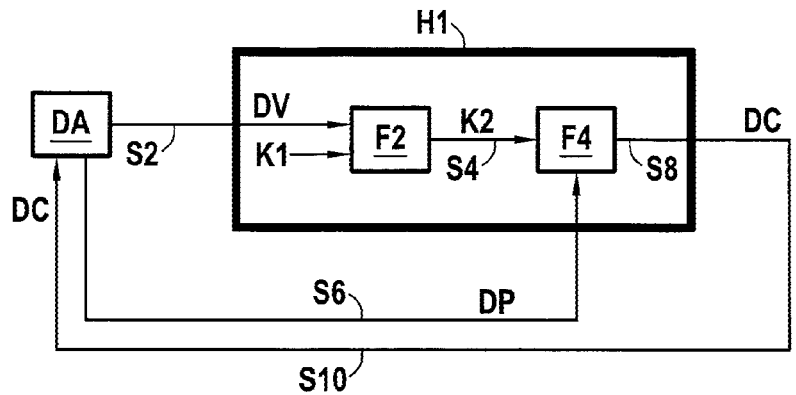
FIGS. 7 and 8 are diagrams showing a variant embodiment of the invention.

As shown in FIG. 7, and as mentioned above, the secure container H1 contains the encryption master key K1 in memory. During encryption A4, the processing device DA (more particularly the encryption module M4) sends (S2) the diversification data DV to the secure container H1. From the diversification data DV and the encryption master key K1 contained in memory, the secure container H1 determines (S4) a derived key K2 by performing a cryptographic function F2 taking as inputs DV and K1. The processing device DA also sends (S6) the personalization data DP to the secure container H1. Using the derived key K2 and the personalization data DP, the secure container H1 produces (S8) the encrypted data DC by performing a cryptographic function F4 taking as inputs K2 and DP. Once the encrypted data DC has been produced, it is delivered (S10) by H1 to the processing device DA.

In a variant embodiment, the encryption master key K1 is not stored in the secure container H1, but the secure container is suitable for receiving the master key K1 from the outside (e.g. from DA) in order to be able to determine the derived key K2 from the master key K2 in combination with the diversification data DV.

Figure 8:
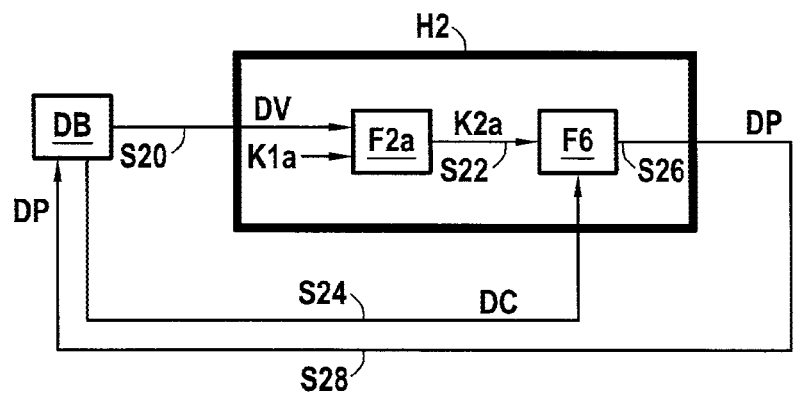

As shown in FIG. 8, the secure container H2 proceeds in a manner analogous to the secure container H1 in order to perform the decryption B10.

More specifically, the secure container H2 contains the above-mentioned decryption master key K1a in memory. During the decryption B10, the personalization device DB (more particularly the decryption module M24) sends (S20) to the secure container H2 the diversification data DV as recovered during the analysis B8. Using the diversification data DV and the decryption master key K1a contained in the memory, the secure container H2 determines (S22) the above-mentioned derived key K2a by performing the cryptographic function F2a using as inputs DV and K1a.

In a first example, the master keys K1 and K1a are identical (asymmetric encryption). Under such circumstances, the functions F2 and F2a that are executed respectively by the containers H1 and H2 are identical, and the derived keys K2 and K2a obtained respectively by executing the functions F2 and F2a are identical.

In a second example, the master keys K1 and K1a are paired keys that are distinct from each other (asymmetric encryption). Under such circumstances, the functions F2 and F2a executed respectively by the containers H1 and H2 are different, and the derived keys K2 and K2a obtained respectively by executing the functions F2 and F2a are different.

In a variant embodiment, the decryption master key K1a is not stored in the secure container H2, but the secure container H2 is suitable for recovering the master key K1a from the outside (e.g. from DB) in order to determine the derived key K2$a$ from the master key K1$a$ in combination with the diversification data DV.

As shown in FIG. 8, the personalization device DB also sends (S24) the encrypted data DC to the secure container H2. Using the derived key K2$a$ and the encrypted data DC, the secure container H2 produces (S26) the personalization data DP by forming a cryptographic function F6 taking as inputs K2$a$ and DC. Once produced, this personalization data DP is delivered (S28) by H2 to the personalization device DB.

The use of secure containers makes it possible to secure the cryptographic means needed for encrypting and decrypting the personalization data (and in particular the master keys K1 and K2). Specifically, giving a master key K1, K1$a$ without protection to a third party entity may present a risk insofar as it is possible by using such a master key to perform reverse engineering so as to recover sensitive information. By using secure containers, an entity in charge of personalizing a security document does not have direct access to the master key itself (since it is contained in secure manner in said container). The use of secure containers makes it possible to encrypt or decrypt the personalization data in secure manner.

Nevertheless, in certain circumstances, a risk remains when an entity possesses a secure container containing such a master key. Specifically, assuming that sufficient resources are deployed for this purpose, sensitive data can always be extracted from such a secure container. By way of example, the entity EA (or a third party) may not have sufficient confidence in the entity EB in order to leave such a secure container with that entity for a long time.

In order to mitigate that problem, in a particular embodiment, the present invention proposes that the secure container enabling encrypted data to be decrypted should itself be contained in a memory of the security document that is to be personalized.

More precisely, in such a particular embodiment, the secure container H2 that is described above with reference to FIG. 8, is now included in the security document C, more precisely in the electronic module 30 in the presently-envisaged example. The personalization device DP is suitable for co-operating with the electronic module 30 of the security document C in order to enable above-described steps S20 to S28 to be performed.

In this particular embodiment, the personalization device DB, and more generally the entity EB that supervises it, have access to the secure container H2—and thus indirectly to the master key K1—only when they hold the security document C that is to be personalized. In the absence of the security document C, the secure container H2 is out of reach for the entity EB, thereby reducing the above-mentioned security risk.

Figure 9:
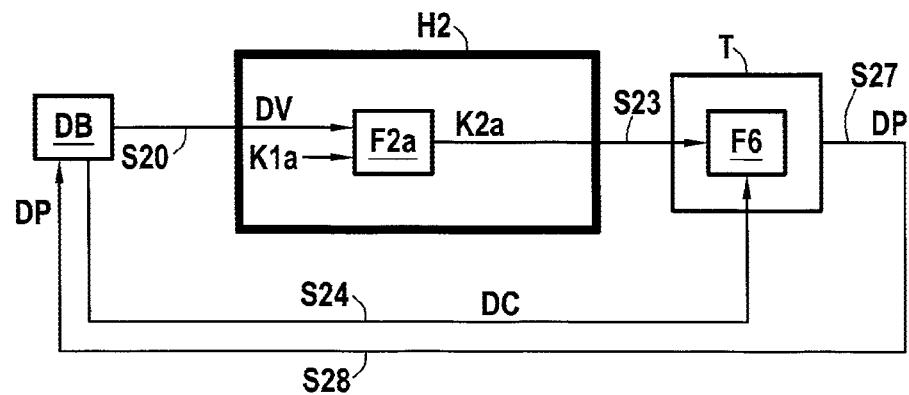
FIG. 9 is a diagram showing a variant embodiment of the invention.

In the examples described with reference to FIG. 8, the secure container H2 is suitable for performing the cryptographic function F6, the secure container H2 possibly being implemented in the security document C. In a variant embodiment shown in FIG. 9, the secure container H2, which may be implemented where appropriate in the electronic module 30 of the security document C, contains the decryption master key K1$a$ and is suitable for executing the cryptographic function F2$a$ in order to obtain the derived key K2$a$. In contrast, the cryptographic function F6 is executed outside the security document C, and thus outside the secure container H2. Under such circumstances, and by way of example, the secure container H2 may be configured to transmit (S23) the derived key K2$a$ to a terminal T that is external to the security document C, and thus external to the secure container H2. By way of example, the external terminal T may be the processing device DB. The external terminal T can thus execute the function F6 from the derived key K2$a$ and the encrypted data DC in order to obtain (S27) the personalization data DP. Where appropriate, the external terminal T can transmit (S29) the personalization data DP to the processing device DB. This embodiment is advantageous when the security document C for personalizing does not have the resources needed for performing the decryption operation.

In a particular example, when the secure container H2 containing the encryption master key K1$a$ is implemented in the document C, the personalization device DB, and more particularly the entity EB that supervises it, have access to the derived key K2$a$, and thus indirectly to the decryption master key K1$a$, only while they hold the security document C for personalizing. In the absence of the security document C, the decryption master key K1$a$ and the derived key K2$a$ are out of reach for the entity EB, thereby reducing the above-mentioned security risks.

In a variant of the embodiment described above with reference to FIG. 9, the decryption master key K1$a$ is not stored in the secure container H2, but the secure container is suitable for receiving this master key K1$a$ (e.g. from DB) in order to determine the derived key K2$a$ from the master key K1$a$ and the diversification data DV.

In a particular embodiment, the container H1 (or H2) does not perform the function F2 (or F2$a$), nor does it contain K1 (or K1$a$). It contains only the key K2 (or K2$a$).

In a particular embodiment, the containers H1 and H2 do not perform the functions F2 and F2$a$ respectively nor do they contain K1 and K1$a$ respectively. They contain only the keys K2 and K2$a$ respectively.

By way of example, each of the secure containers H1 and H2 is suitable for receiving the respective derived key K2 or K2$a$ from the outside in order to perform the respective functions F4 and F6.

As mentioned above, the invention makes it possible to personalize a security document in secure manner. Nevertheless, it may be observed that other applications may be envisaged for the invention. Specifically, it is possible to envisage using the invention for a purpose other than personalizing a security document.

More generally, the invention seeks to transmit documents associated with a security document in secure manner from a first entity to a second entity.

A person skilled in the art understands that the above-described embodiments and variants merely constitute non-limiting examples of how the invention may be implemented. In particular, the person skilled in the art can envisage any adaptation or combination of the above-described embodiments and variants in order to satisfy some particular need.

In an embodiment, the invention is implemented by means of software and/or hardware components. In this context, the term "module" as used in the present disclosure may correspond equally well to a software component, to a hardware component, or to a combination of hardware and software components.

The invention claimed is:

1. A method of personalizing, performed by a system comprising a processing device and a personalization device, for personalizing a security document, said method comprising:
 obtaining, by the processing device, personalization data for personalizing the security document;

encrypting, by the processing device, the personalization data using diversification data associated with the security document, to produce encrypted data, wherein, during the encrypting, the personalization data is encrypted using an encryption master key in combination with the diversification data; and transmitting, by the processing device, the encrypted data to the personalization device in order to enable the personalization device to personalize the security document from the encrypted data and the diversification data, receiving, by the personalization device, the encrypted data;

analyzing, by the personalization device, the security document to recover diversification data associated with said security document;

decrypting, by the personalization device, the encrypted data using the diversification data in combination with a decryption master key in order to obtain the personalization data, wherein the decrypting comprises:

determining a derived key from the decryption master key and from the diversification data recovered by the personalization device during said analyzing; and using the derived key to decrypt the encrypted data received by the personalization device to obtain said personalization data; and personalizing, by the personalization device, the security document based on the personalization data.

2. The method according to claim 1, wherein the diversification data is present in or on the security document.

3. The method according to claim 1, wherein the encryption master key is paired with the decryption master key, the decryption master key being distinct from the encryption master key.

4. The method according to claim 1, wherein the processing device uses a secure container for performing said encrypting, the encryption master key being stored in the secure container, and wherein said secure container:

determines a derived key from the diversification data and the encryption master key; and uses the derived key to encrypt the personalization data in order to produce the encrypted data.

5. The method according to claim 1, wherein the security document comprises a memory storing at least a portion of the diversification data, and the analyzing comprises reading the memory to recover said at least a portion of the diversification data.

6. The method according to claim 1, wherein the decryption master key is paired with an encryption master key distinct from the decryption master key.

7. The method according to claim 1, wherein the personalization device co-operates with a secure container to perform said decrypting, wherein said secure container decrypts the encrypted data received by the personalization device to obtain said personalization data.

8. The method according to claim 7, wherein the security document includes an electronic module suitable for implementing the secure container.

9. The method according to claim 7, wherein the decryption master key is stored in the secure container.

10. The method according to claim 1, the personalization device co-operating with a secure container to implement said decrypting, wherein said secure container:

determines a derived key from the decryption master key and from the diversification data recovered by the personalization device during said analyzing; and transmits the derived key to an external terminal so that the external terminal decrypts the encrypted data to obtain said personalization data.

11. The method according to claim 1 wherein at least a portion of the diversification data recovered during said analyzing comprises a pattern formed on a surface of the security document.

12. The method according to claim 1, wherein the personalizing comprises physically modifying a surface of the security document.

13. A non-transitory computer-readable media including instructions that, when executed by a computer of a system comprising a processing device and a personalization device, perform operations for personalizing a security document, the operations comprising:

obtaining, by the processing device, personalization data for personalizing the security document;

encrypting, by the processing device, the personalization data using diversification data associated with the security document or with a person, to produce encrypted data, wherein, during the encrypting, the personalization data is encrypted using an encryption master key in combination with the diversification data;

transmitting, by the processing device, the encrypted data to a personalization device in order to enable the personalization device to personalize the security document from the encrypted data and the diversification data-receiving, by the personalization device, the encrypted data;

analyzing, by the personalization device, the security document to recover diversification data associated with said security document;

decrypting, by the personalization device, the encrypted data using the diversification data in combination with a decryption master key in order to obtain the personalization data, wherein the decrypting comprises:

determining a derived key from the decryption master key and from the diversification data recovered by the personalization device during said analyzing; and using the derived key to decrypt the encrypted data received by the personalization device to obtain said personalization data; and personalizing, by the personalization device, the security document based on the personalization data.

14. The non-transitory computer-readable media according to claim 13, wherein the personalizing comprises physically modifying a surface of the security document.

15. A system comprising a processing device and a personalization device for personalizing a security document, the processing device comprising:

an obtaining module suitable for obtaining personalization data for personalizing the security document;

an encryption module suitable for encrypting the personalization data using diversification data associated with the security document, to produce encrypted data, wherein the encryption module is configured to encrypt the personalization data from an encryption master key in combination with the diversification data; and a transmission module suitable for transmitting the encrypted data to a personalization device in order to enable the personalization device to personalize the security document from the encrypted data and the diversification data;

the personalization processing device comprising:
   a receive module suitable for receiving encrypted data;
   an analysis module suitable for analyzing the security document so as to recover diversification data associated with said security document;
   a decryption module suitable for decrypting the encrypted data using the diversification data in combination with a decryption master key in order to obtain the personalization data, wherein the decryption module is configured to:
      determine a derived key from the decryption master key and from the diversification data recovered by the personalization device during said analyzing; and
      use the derived key to decrypt the encrypted data received by the personalization device to obtain said personalization data; and
   a personalization module suitable for personalizing the security document from the personalization data.

16. The system according to claim 15, wherein the personalization module is configured, as part of the personalizing, to physically modify a surface of the security document.

* * * * *